United States Patent [19]
Sheehan

[11] Patent Number: 6,140,582
[45] Date of Patent: Oct. 31, 2000

[54] SAFETY LOCK CONDUIT CONNECTOR

[76] Inventor: Robert Kenneth Sheehan, 3530 Rawson Pl., Cincinnati, Ohio 45209

[21] Appl. No.: 09/299,754

[22] Filed: Apr. 27, 1999

Related U.S. Application Data

[60] Provisional application No. 60/083,157, Apr. 27, 1998.

[51] Int. Cl.[7] .................................. H02G 3/18
[52] U.S. Cl. ............................ 174/65 G; 174/153 R; 174/153 G; 16/2.1; 16/2.2; 439/462; 439/584; 248/56
[58] Field of Search .................. 174/65 R, 65 G, 174/153 R, 153 G, 59, 151, 50.52; 439/462, 584; 16/2.1, 2.2; 248/56

[56] References Cited

U.S. PATENT DOCUMENTS

| | | | |
|---|---|---|---|
| 1,810,958 | 6/1931 | Fullman | 174/65 R |
| 2,245,422 | 6/1941 | Whittaker | 174/65 R |
| 2,947,800 | 8/1960 | Badeau et al. | 174/65 R |
| 3,006,981 | 10/1961 | Weber | 174/65 R |
| 4,262,166 | 4/1981 | Radzishevsky et al. | 174/65 R |
| 5,647,613 | 7/1997 | Marik et al. | 285/195 |
| 5,894,109 | 4/1999 | Marik | 174/65 R |
| 5,905,230 | 5/1999 | Marik | 174/65 R |

Primary Examiner—Kristine Kincaid
Assistant Examiner—Dhiru Patel
Attorney, Agent, or Firm—Neal O. Willmann

[57] ABSTRACT

A connector for facilitating the connection of electrical conduit or cable to junction box, which is fashioned from a single piece of material, and features a saddle member and rolled throat that are integral parts of the connector. These integrated features simplify manufacturing and ultimate use of the disclosed connector.

5 Claims, 2 Drawing Sheets

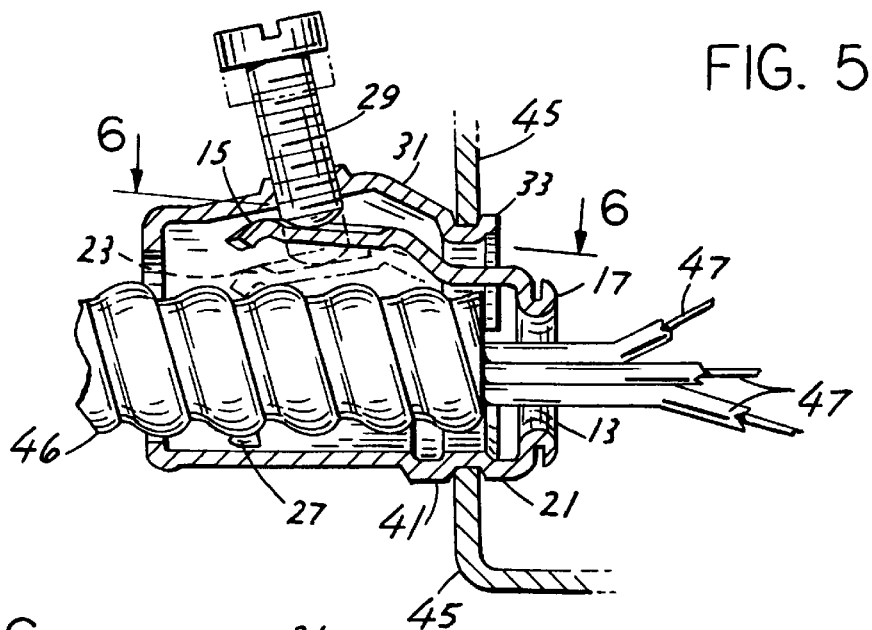
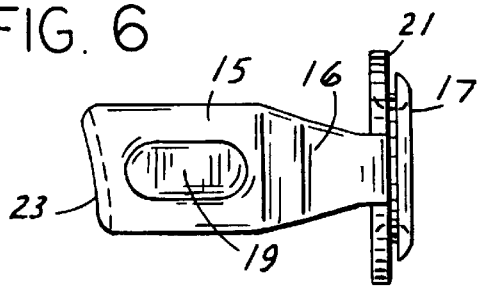
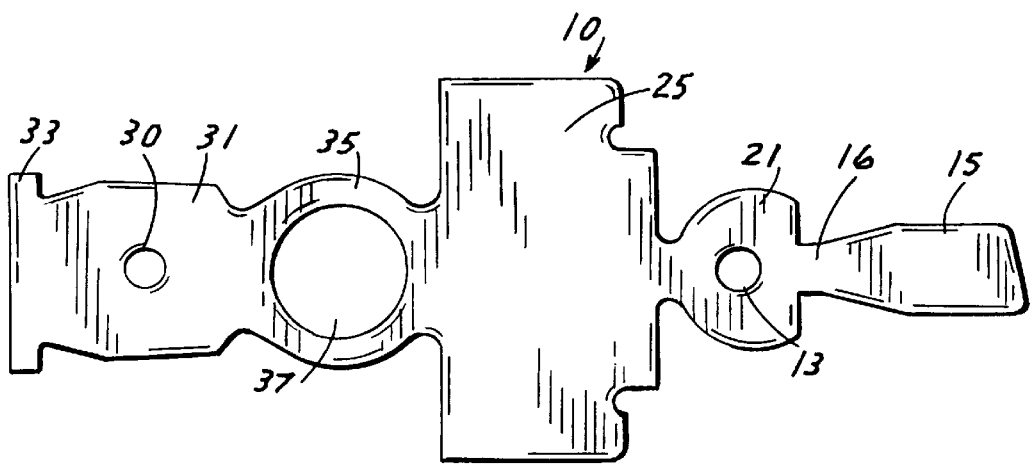

SAFETY LOCK CONDUIT CONNECTOR

CROSS REFERENCE TO RELATED APPLICATION

This application claims the benefit of U.S. Provisional Application No. 60/083,157 filed Apr. 27, 1998.

BACKGROUND OF THE INVENTION

This disclosure relates generally to electrical connectors and specifically to connectors that are intended to be used to introduce one or more electrical conduits into a junction box or electrical enclosure. Typically, these connectors are designed to be attached to junction boxes by insertion into and friction attachment to, the "knock-out" openings typically provided in the walls of the junction box. A traditional part of the design of most connectors is a means for holding or securing the cable or conduit within the connector so as to lessen the force on the connections being made in the junction box and provide safe, secure and reliable electrical service. Typically, the cable or conduit entering the junction box is secured within the connector by an adjustable clamping arrangement. This clamping arrangement will generally take the form of a small metal plate, called a saddle, arched somewhat to conform to the shape of the conduit, attached to an adjustment screw, which when turned, will depress the saddle against the conduit and thereby secure it within the confines of the connector. As force is applied through the saddle to the conduit, a countervailing force is applied to the adjustment screw and its threaded opening, typically in the cap of the connector, which, in turn, manifests itself by elevating a collar element in the cap, which ultimately, secures the connector to the junction box.

DESCRIPTION OF THE PRIOR ART

The connectors of the prior art are presently multi-component plastic or metal devices. A fairly typical example of a connector is depicted in U.S. Design Pat. No. 336, 282 to Guginsky dated Jun. 8, 1993. Many of the elements incorporated in the disclosed connector are present and readily apparent in the Guginsky design; however, the Guginsky connector is not fabricated from a single piece of material and therefore involves costs of assembly and lost parts that are completely obviated by connectors made according to the disclosed design.

SUMMARY OF THE INVENTION

More specifically, what I envision as my invention and contribution to the art is a connector for securing an electrical conduit or cable to a junction box or electrical enclosure, said connector, in single-piece construction, comprising: a housing having a bottom and a plurality of sides; an entry port defined by a hoop attached to the bottom of said housing; a cap attached to said hoop opposite said bottom attachment having a collar mateable with said junction box and a threaded opening for the insertion of an adjustment screw; an exit port defined by a throat attached to said housing opposite said hoop attachment; and a saddle attached to said throat, opposite said housing attachment, said saddle, when configured so as to be beneath and approximately parallel to said cap, can be depressed by tightening an adjustment screw in said threaded opening to secure the placement of conduit within said connector and to impinge said collar against the perimeter of an opening in said junction box to secure the attachment of said connector to said box.

BRIEF DESCRIPTION OF THE DRAWING

FIG. 5 is a side elevational view of the disclosed connector, in full cross-section, taken along line 5—5 of FIG. 3, in combination with a partial view of a junction box, also in full cross-section, and a clamping screw depicting how electrical conduit is held in the connector and the connector is held in the box.

FIG. 6 is a partial top plan view of the connector taken along line 6—6 of FIG. 5 showing only the saddle, throat and throat flange of the disclosed connector.

FIG. 7 is a side elevational view of the saddle, its cleat and its attachment to the throat.

FIG. 8 is an end elevational cross-sectional view of a partial view of the disclosed connector taken along line 8—8 of FIG. 2.

FIG. 9 is a top plan view of the one-piece body and saddle construction of the disclosed connector.

DESCRIPTION OF THE PREFERRED EMBODIMENT

Figure 1:
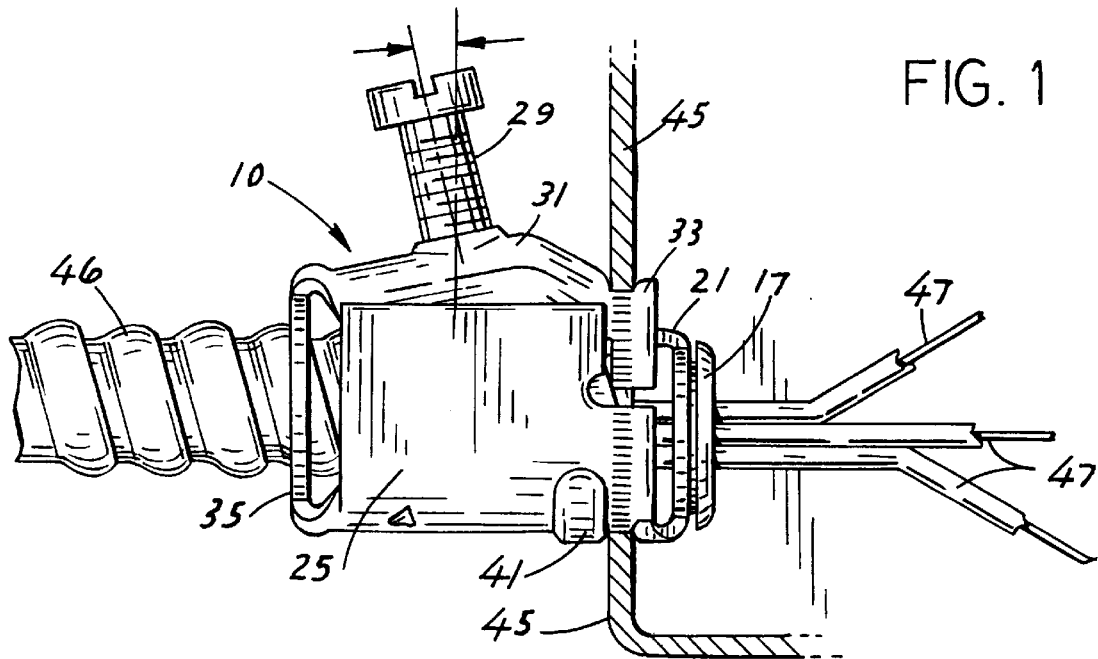
FIG. 1 is a side elevational view of the disclosed connector with a junction box in cross-section to show the inter-relationship of the connector, electrical conduit and said box or enclosure.

The connector of this disclosure is readily understood by reference to the drawing. In FIG. 1, an elevated side view shows the connector 10 in combination with a cable conduit 46 and a panel wall of a junction box 45. The wires 47 of the cable are presented to the interior of the box ready to be connected with other wires. In FIG. 1, it is also apparent that the connector 10 is securely attached to the panel of the box 45 by having the collar 33 of the cap 31 of the connector snugly positioned within the box 45.

It is important to note at this juncture that the disclosed connector can be used on virtually any style of electrical conduit or cable, e.g., armored cable, type MC cable, flexible metal conduit, E.M.T., non-metallic sheathed cable, and the like. And furthermore, the disclosed connector can also be used in a multitude of various other non-electrical fastening and connection applications, e.g., in the plumbing and automotive industries.

Figure 2:
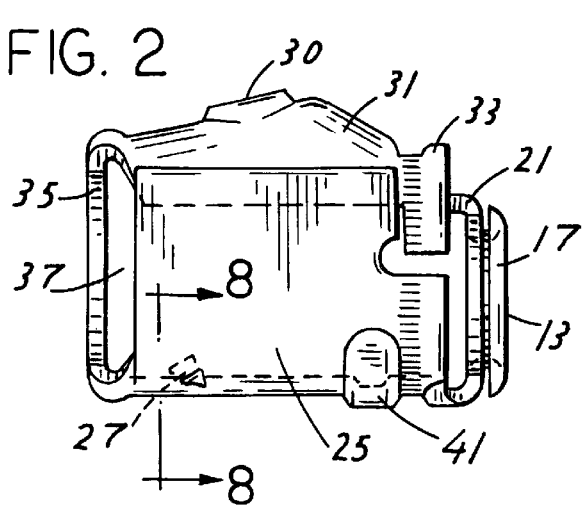
FIG. 2 is a side elevational view of the disclosed connector.

In FIG. 2, additional components of connector 10 become apparent. In this elevated side view, both sides being the same, there is a clearer view of the cap 31 and its collar 33. Additionally, there are the defining members of both the cable entry port 37 and the cable exit port 13. The former is defined by the hoop 35 and the latter by the throat 17. Furthermore, supporting the throat 17 is the throat flange 21. Other details of the connector shown in FIG. 2 are the bumps 27 on the bottom of the housing 25 interior, which are denominated "frog's eyes" and the ridge 41 extending across the exterior bottom of the connector housing 25 for the purpose of assisting in the proper positioning of the connector with a junction box. This positioning is depicted in FIG. 1 where it is clear that the ridge 41 limits the entry of the connector 10 into the box 45.

Figure 3:
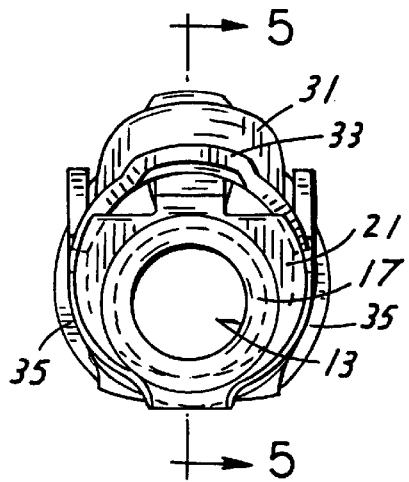
FIG. 3 is a front end elevational view of the disclosed connector.

FIG. 3, providing an elevated front end view of the connector, clearly establishes the relationship among the cable exit port 13, its defining member, the throat 17 and the supporting member for the throat, the throat flange 21. Also apparent in FIG. 3 is the relationship between the throat flange 21 and the saddle 15. Although the saddle 15 itself is not clearly seen in FIG. 3, the saddle hinge 16, originating on the throat flange 21, is seen as it bends rearward to position the saddle 15 generally beneath and parallel to the cap 31.

In a preferred embodiment of the connector 10, the throat 17 is rolled, either inwardly or outwardly to provide a smooth, rounded edge to facilitate pulling wires through the connector and into the junction box. This rolled edge simply involves forming the interior edge of the throat during the manufacturing process and produces a product that does not deviate from the unitary construction of the connector.

Figure 4:
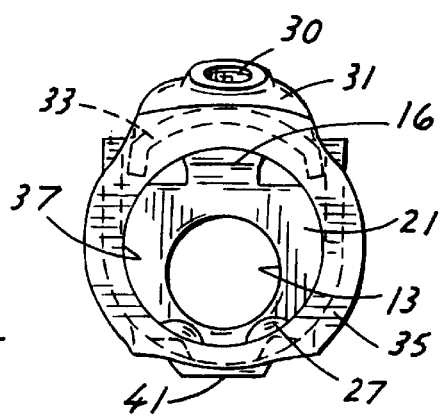
FIG. 4 is a rear end elevational view of the disclosed connector.

In FIG. 4, looking through the connector from the opposite end of FIG. 3, the cable entry port 37 of the connector is prominently featured. Also apparent is the cable exit port 13, which is typically smaller than the cable entry port because the wires are generally stripped of their covering before entering the junction box 45, and the metal armor or other protective jacket ends at a point within the connector 10.

FIG. 5 presents a full cross-sectional view of the connector illustrating the dynamics of the connector. Specifically, FIG. 5 shows the saddle 15 being depressed by the adjustment screw 29. The phantom view of the saddle 15 shows the saddle cleat 23 interacting with the cable covering to aid in gripping the cable and holding it securely in place.

FIG. 5 also depicts the preferred orientation of the adjustment screw 29. When positioned at an angle of somewhat less than 90°, more room for the user's hands and tool is provided, so tightening the screw can be effected without bumping into or interfering with the panel wall 45 of the junction box or electrical panel.

It is also in FIG. 5 that the second dynamic of the integrated saddle 15 can be explained and seen most dramatically. As the adjustment screw 29 is tightened down on the saddle to the point where firm resistance with the cable is encountered, an elevated or upward force will be exerted on the screw 29 which will, in turn, exert an elevating force on the cap 31 of the connector. This force, in opposition to the downward force being applied on the saddle 15, will urge the collar 33 against the periphery of the "knock-out" in the panel of the junction box 45 creating a very firm friction fit. So, as the integrated saddle is depressed against the cable to retain it securely in the connector, the collar 33 of the connector 10 is expanded within the "knock-out" in the junction box to provide a more secure attachment.

A closer look at the integrated saddle 15 is provided by FIG. 6. This view shows its orientation relative to the throat 17 and throat flange 21. The connection between the saddle and the throat flange is provided by a narrow, isthmus-like structure which is called the saddle hinge 16. In addition to making the saddle an integral part of the connector 10, the hinge, of course, functions like a hinge allowing the saddle to be depressed with relative ease. Also apparent in FIG. 6 is a depression 19 on the interior surface of the saddle 15 which serves to confine the action of the adjustment screw 29 to prevent straying or slipping to the side as it tightens down on the saddle.

FIG. 7 provides an additional perspective of the integrated saddle 15. In this view the integrated relationship between the collar flange 21 and the tongue or hinge 16 is especially apparent, and the "grabbing" capability of the cleat 23 can also be readily appreciated.

In FIG. 8, a partial cross-section of the body 25 of the connector, a complete depiction of the aforementioned "frog's eyes" 27 is provided, and, with very little imagination, anyone can see how those bumps or protuberances on the interior surface of the connector body 25 can assist in securely retaining the conduit within the connector.

Finally, a different perspective of the disclosed connector 10 is presented in FIG. 9. Here, the connector is shown in plan view to illustrate the connector's single-piece construction. FIG. 9 depicts, roughly, the configuration of the connector, in the flat, before forming it to its final shape. This unitary construction presents significant cost savings in material and similar savings in labor during both fabrication and use. Clearly, the connector 10, as depicted in FIG. 9 can be easily stamped, molded or cast from a variety of materials and then bent to conform to the desired product.

While the foregoing is a complete and detailed description of the preferred embodiments of the disclosed connector, numerous variations and modifications may also be employed to implement the all-important purposes of the invention without departing from the spirit of the invention; and therefore the elaboration provided should not be assumed to limit, in anyway, the scope of the invention which is fairly defined by the appended claims.

What I claim is:

1. A connector for securing an electrical connection to a junction box said connector, in single-piece construction, comprising:

a housing having a bottom and a plurality of sides;

an entry port defined by a hoop attached to the bottom of said housing;

a cap attached to said hoop opposite said bottom having a collar mateable with said junction box and a threaded opening for the insertion of an adjustment screw;

an exit port defined by a throat attached to said housing opposite said hoop; and a saddle attached to said throat, opposite said housing, said saddle, when configured so as to be beneath and approximately parallel to said cap, can be depressed by tightening an adjustment screw in said threaded opening to secure a placement of conduit within said connector and to impinge said collar against the perimeter of an opening in said junction box to secure an attachment of said connector to said box.

2. A connector according to claim 1 wherein said threaded opening to provide for the tightening of said screw is at an angle of less than 90°.

3. A connector according to claim 1 wherein the throat has a rolled interior edge.

4. A connector according to claim 1 wherein the saddle has an anterior depression for receiving the torque of said threaded adjustment screw.

5. A connector according to claim 1 wherein the bottom of the housing is provided with a plurality of "Interior bumps".

* * * * *